United States Patent
Kawase et al.

(10) Patent No.: US 11,084,433 B2
(45) Date of Patent: Aug. 10, 2021

(54) TOTAL SUPPORTING METHOD AND TOTAL SUPPORTING SYSTEM OF WIRE HARNESS

(71) Applicant: Hitachi Metals, Ltd., Tokyo (JP)

(72) Inventors: Kenji Kawase, Tokyo (JP); Katsuju Aoki, Tokyo (JP); Raifu Yamamoto, Tokyo (JP); Masahiko Namekawa, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/169,116

(22) Filed: Oct. 24, 2018

(65) Prior Publication Data
US 2019/0118741 A1    Apr. 25, 2019

(30) Foreign Application Priority Data

Oct. 24, 2017 (JP) .............................. JP2017-205164
Oct. 24, 2017 (JP) .............................. JP2017-205165
Nov. 21, 2017 (JP) .............................. JP2017-223233

(51) Int. Cl.
*B60R 16/02* (2006.01)
*H01B 7/00* (2006.01)
(Continued)

(52) U.S. Cl.
CPC ...... *B60R 16/0215* (2013.01); *B60R 16/0207* (2013.01); *G06F 30/18* (2020.01);
(Continued)

(58) Field of Classification Search
CPC ............ B60R 16/0215; B60R 16/0207; H01B 7/0045; H01B 13/012; H02G 3/0462;
(Continued)

(56) References Cited

U.S. PATENT DOCUMENTS 6,231,051 B1 * 5/2001 Mueller ............... H02G 15/013
174/21 R
6,272,387 B1 * 8/2001 Yoon ................... B60R 16/0207
700/17
(Continued)

FOREIGN PATENT DOCUMENTS

CN    104700962 A    6/2015
JP    08202759 A    8/1996
(Continued)

OTHER PUBLICATIONS

WO 2017/149652 English Translation, Sep. 8, 2017 (Year: 2017).*
(Continued)

*Primary Examiner* — Steven T Sawyer
(74) *Attorney, Agent, or Firm* — Meunier Carlin & Curfman LLC

(57) ABSTRACT

To provide a total supporting method of a wire harness. The method includes a designing supporting step of designing the wire harness including a plurality of or a single electrical wire to be wired on a moving body based on 3D design data of the moving body, and creating 2D design data of the designed wire harness; a manufacturing supporting step of displaying in full scale information indicating a manufacturing method of the wire harness based on the 2D design data created, and manufacturing the wire harness based on the display; and a wiring supporting step of displaying wiring step information or information related to a step of wiring the wire harness on the moving body on a portable information processing terminal, and wiring the wire harness manufactured by the manufacturing supporting step on the moving body while looking at the display.

19 Claims, 14 Drawing Sheets

(51) Int. Cl.
*H02G 3/04* (2006.01)
*G06F 30/18* (2020.01)
*H01B 13/012* (2006.01)
*G06F 30/15* (2020.01)
*G06F 113/16* (2020.01)

(52) U.S. Cl.
CPC ......... *H01B 7/0045* (2013.01); *H02G 3/0462* (2013.01); *G06F 30/15* (2020.01); *G06F 2113/16* (2020.01); *H01B 13/012* (2013.01)

(58) Field of Classification Search
CPC ...... G06F 30/18; G06F 30/15; G06F 2113/16; G06F 30/20; G06T 17/00
See application file for complete search history.

(56) References Cited

U.S. PATENT DOCUMENTS

| | | | |
|---|---|---|---|
| 7,200,537 | B2 | 4/2007 | Ozaki |
| 7,558,705 | B1 * | 7/2009 | Hughes ................. G06F 30/18 703/1 |
| 8,996,347 | B2 | 3/2015 | MacLean et al. |
| 2003/0023947 | A1 * | 1/2003 | Sakakura ............ B60R 16/0207 716/126 |
| 2003/0050723 | A1 * | 3/2003 | Ozaki ................. B60R 16/0207 700/97 |
| 2005/0183052 | A1 * | 8/2005 | Ash-Rafzadeh ........ G06F 17/50 716/126 |
| 2006/0141823 | A1 * | 6/2006 | Yamane .................. G06F 30/23 439/76.2 |
| 2007/0277372 | A1 * | 12/2007 | Aida ...................... H01R 43/28 29/747 |
| 2008/0054154 | A1 * | 3/2008 | Lin ........................ H01R 43/28 248/693 |
| 2009/0063114 | A1 * | 3/2009 | Demizu .................. G06F 30/00 703/7 |
| 2015/0161781 | A1 * | 6/2015 | Philbert ................ G06T 7/0004 382/141 |
| 2016/0225492 | A1 * | 8/2016 | Toyama ........... H01B 13/01227 |
| 2018/0108458 | A1 * | 4/2018 | Maki ................ H01B 13/01209 |
| 2019/0067919 | A1 | 2/2019 | Kawase et al. |

FOREIGN PATENT DOCUMENTS

| | | |
|---|---|---|
| JP | 2001251741 A | 9/2001 |
| JP | 2003-022721 A | 1/2003 |
| JP | 2003022720 A | 1/2003 |
| JP | 2006155060 A | 6/2006 |
| JP | 2010137649 A | 6/2010 |
| JP | 2010252603 A | 11/2010 |
| JP | 2015-191387 A | 11/2015 |
| JP | 2016206871 A | 12/2016 |
| WO | 2017/149651 A1 | 9/2017 |
| WO | 2017/149652 A1 | 9/2017 |

OTHER PUBLICATIONS

Notice of Reasons for Rejection. Issued by the Japanese Patent Office in Japanese Application No. 2018-189591 dated Jan. 7, 2019. English translation included. 4 pages.
Extended European Search Report dated Mar. 1, 2019 in the counterpart European patent application No. 18198802.3, 8 pages.
Extended European Search Report dated Mar. 1, 2019 in the related European patent application No. 18201164.3, 8 pages.
Decision to Grant a Patent in 2018-111498, dated Aug. 30, 2018.
Office Action dated Aug. 2, 2019 in the counterpart Chinese patent application No. 201810386515.8 and its English translation.
Office Action dated Mar. 24, 2020 in the counterpart Chinese patent application No. 201810386515.8 and its English translation.
Office Action dated Feb. 27, 2020 in the counterpart European patent application No. 18 198 802.3.
Office Action dated Sep. 15, 2020 in the related European patent application No. 18198802.3.
Notice of Reason(s) for Refusal dated Jan. 26, 2021 in related Japanese patent application No. 2017-205165 and its English translation.
Summons to attend oral proceedings pursuant to Rule 115(1) EPC issued in European Patent Application No. 18 198 802.3, dated May 17, 2021.
Ostecgroup: "Interactive Harness Assembly Board IHAB", Nov. 17, 2015, https://www.youtube.com/watch?v=HrdE6CN5pOQ.
Laselec: "Laselec-interactive wire assembly board", Nov. 20, 2015, https://www.youtube.com/watch?v=omKgCYUhFrQ.

* cited by examiner

TOTAL SUPPORTING METHOD AND TOTAL SUPPORTING SYSTEM OF WIRE HARNESS

CROSS-REFERENCE TO RELATED APPLICATIONS

This application claims the benefit of Japanese Patent Application Nos. 2017-205164 and No. 2017-205165 filed on Oct. 24, 2017 with the Japan Patent Office, and Japanese Patent Application No. 2017-223233 filed on Nov. 21, 2017 with the Japan Patent Office, the entire disclosures of which are incorporated herein by reference.

BACKGROUND

The present disclosure relates to a total supporting method and a total supporting system of a wire harness.

A wire harness in which electrical wires for transmitting power, electric signals, and the like are bundled is wired in a moving body such as a vehicle, an airplane, and the like. The work of designing and manufacturing the conventional wire harness, and wiring the manufactured wire harness at a desired position on the moving body is a complicated work that requires skill and time.

For example, in reviewing a path for wiring the wire harness carried out in designing, a review based on a value obtained by measuring an actual object (vehicle body or machine body in which the wire harness is wired) of the moving body is carried out. Acquiring an accurate value in the measurement of the actual object is a complicated work that requires skill. Furthermore, if an unskilled person carries out the measurement, it may require a long time to acquire a correct value.

In addition, in the work for wiring the wire harness in the moving body, a technique that facilitates the attachment of the wire harness to the moving body has been proposed (see, e.g., Japanese Unexamined Patent Application Publication No. 2010-137649).

SUMMARY

As described above, in the method for reviewing based on the value obtained by measuring the actual object of the moving body, the designing of the wiring path cannot be carried out until the actual object of the moving body is completed. Thus, a problem in that a considerably long time is required from the designing of the wire harness to the manufacturing and the wiring arises.

Furthermore, in the wiring work of the wire harness, a specific working process on to which device and in what order to connect the terminal of the wire harness is not determined. For example, to which device to connect the terminal of each wire harness may be determined, but in what order to connect is not determined. Thus, the order for connecting the terminal of the wire harness is up to the worker.

The time required for the wiring work thus varies greatly depending on the level of skill of the worker. In other words, the work time of the unskilled worker becomes long. Furthermore, if the order for connecting the terminal of the wire harness is inappropriate, it becomes difficult to wire the wire harness compactly. In other words, the wire harness may not fit into a space ensured to wire the wire harness.

In one aspect of the present disclosure, it is desirable to provide a total supporting method and a total supporting system of a wire harness that can lower the degree of difficulty of the work from the designing to the wiring of the wire harness used in the moving body, and reduce the time required for the work.

A total supporting method of a wire harness according to a first aspect of the present disclosure comprises a designing supporting step of three-dimensionally designing the wire harness comprising a plurality of or a single electrical wire to be wired on a moving body based on three-dimensional (3D) design data of the moving body, and creating two-dimensional (2D) design data of the designed wire harness; a manufacturing supporting step of displaying in full scale information related to a length direction of the wire harness when displaying information indicating a manufacturing method of the wire harness based on the 2D design data created by the designing supporting step, and manufacturing the wire harness based on the display; and a wiring supporting step of displaying wiring step information or information related to a step of wiring the wire harness on the moving body on a portable information processing terminal, and wiring the wire harness manufactured by the manufacturing supporting step on the moving body while looking at the display.

A total supporting system of a wire harness according to a second aspect of the present disclosure comprises a designing supporting device for three-dimensionally designing the wire harness comprising a plurality of or a single electrical wire to be wired on a moving body based on 3D design data of the moving body, and creating 2D design data of the designed wire harness; a manufacturing supporting device for displaying in full scale information related to a length direction of the wire harness when displaying information indicating a manufacturing method of the wire harness based on the 2D design data created by the designing supporting device; and a portable information processing terminal for displaying wiring step information, which is information related to a step for wiring the wire harness on the moving body.

According to the total supporting method of the first aspect and the total supporting system of the second aspect of the present disclosure, the wire harness can be designed based on the 3D design data of the moving body. That is, even in a situation where the actual object of the moving body does not exist, the wire harness can be designed, and the time required for designing can be easily reduced. The degree of difficulty of design can be easily lowered compared to when designing the wire harness while measuring the actual object of the moving body.

Furthermore, the information indicating the manufacturing method of the wire harness can be displayed, and the information related to the length direction of the wire harness of the relevant information can be displayed in full scale. That is, the wire harness can be manufactured without using the figure of the wire harness printed on a paper, and the degree of difficulty in manufacturing can be easily lowered.

Furthermore, at the time of work for wiring the wire harness, the wiring step information corresponding to the wiring step of the wire harness and the wiring path information can be displayed on the portable information processing terminal. That is, the information processing terminal can be carried into a place for carrying out the wiring of the wire harness, and the wiring step information corresponding to the wiring step can be displayed on the information processing terminal that was carried in. Thus, the checking time of the step can be reduced, and the time required for the work for wiring the wire harness can be easily reduced. Furthermore, the degree of difficulty of the work for wiring the wire harness can be easily lowered.

Effect of the Invention

According to the total supporting method and the total supporting system of the wire harness of the present disclosure, In one aspect of the present disclosure, the degree of difficulty of the work from the designing to the wiring of the wire harness used in the moving body can be lowered, and the time required for the work can be reduced.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

A total supporting system 1 of the present embodiment is a system that supports designing, manufacturing, and wiring of a wire harness 500 to be wired in a vehicle body of a railroad vehicle (which corresponds to one example of moving body).

Figure 2:
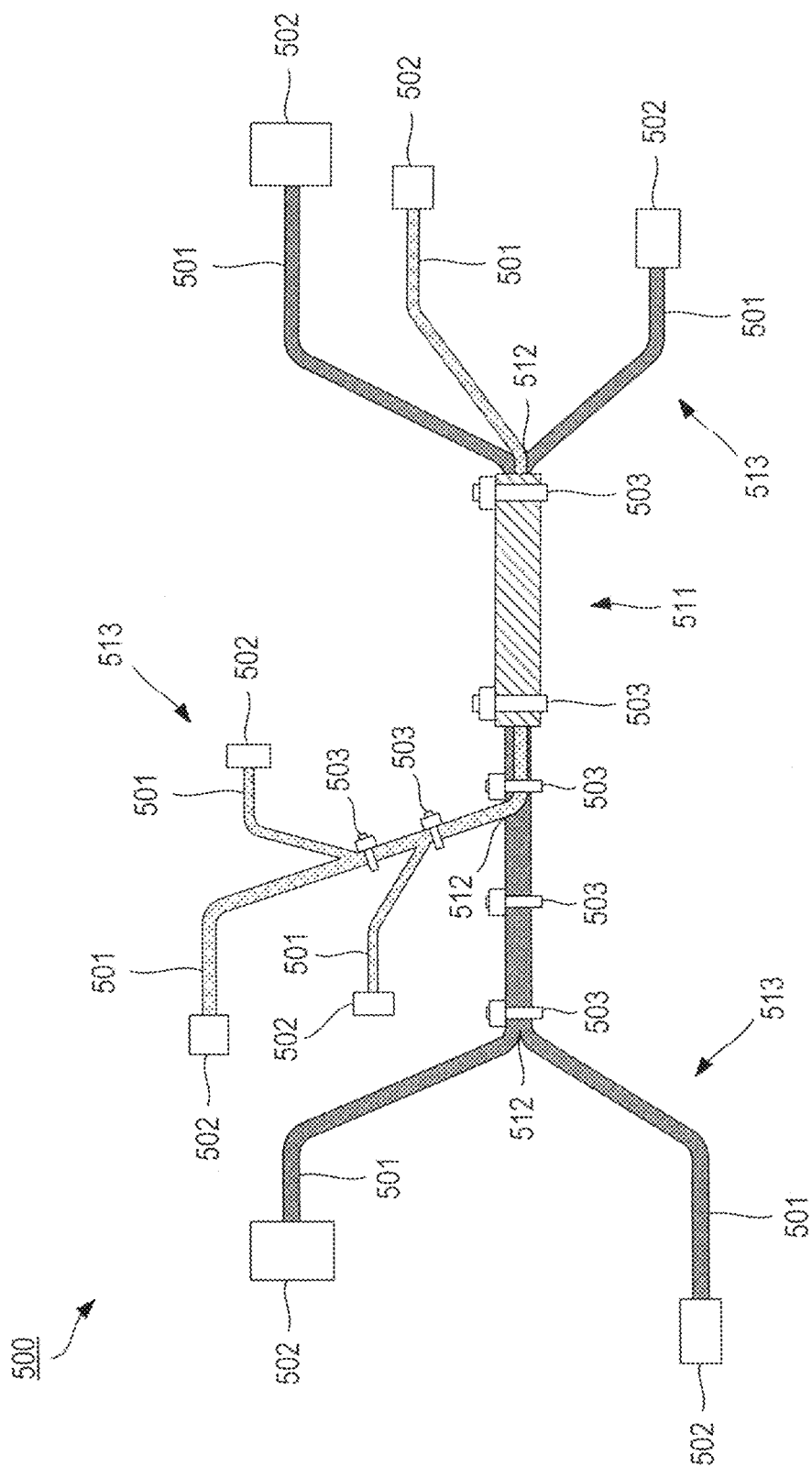
FIG. 2 is a schematic view describing a configuration of a wire harness.

As shown in FIG. 2, the wire harness 500 has a configuration in which a plurality of electrical wires 501 connecting the devices mounted on the vehicle body of the railroad vehicle are bundled. The electrical wire 501 has a function of transmitting power, electric signals, and the like between the connected devices. A connector 502 having a shape corresponding to a device to be connected is attached to an end of the electrical wire 501.

The wire harness 500 comprises a binding member 503 for bundling and binding the plurality of electrical wires 501. The binding member 503 comprises an adhesive tape, a banding member made of resin such as tube, banding band, and the like, a banding member made of metal, a waxing string, and the like. A through-hole may be formed in the banding member. A fixing member such as a bolt used to fix the wire harness 500 bundled by the banding member to the vehicle body of the railroad vehicle is inserted into the through-hole.

In the present embodiment, the binding member 503 may be an adhesive tape. A portion where the plurality of electrical wires 501 are bundled in the wire harness 500 is also represented as a main line 511, a position where the electrical wires 501 are branched from the main line is represented as a branched point 512, and a portion farther from the portion branched from the main line is represented as a branch line 513.

Figure 1:
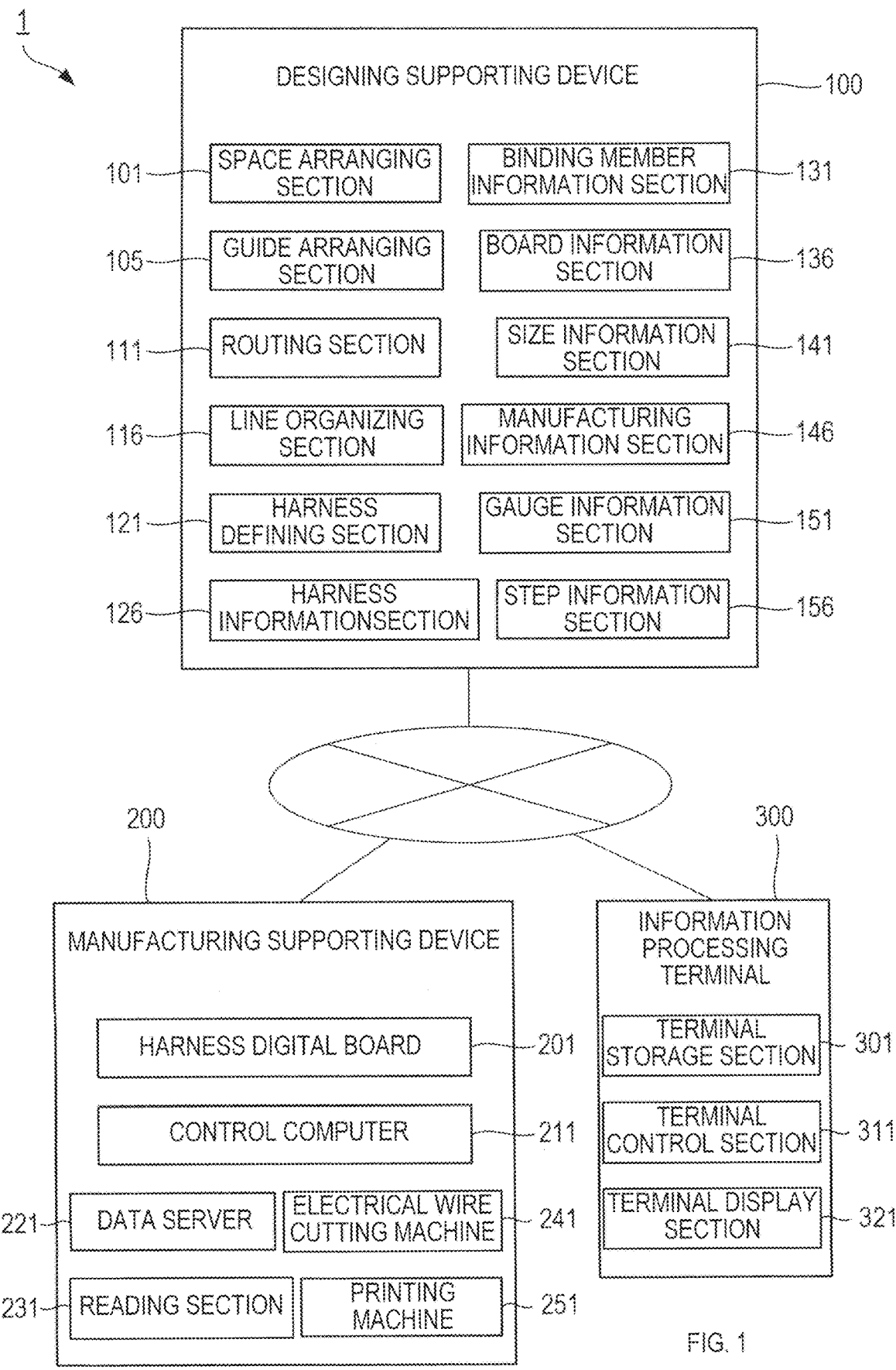
FIG. 1 is a block diagram describing a configuration of a wiring supporting system according to one embodiment of the present disclosure.

As shown in FIG. 1, the total supporting system 1 comprises a designing supporting device 100 that carries out the designing support of the wire harness 500, a manufacturing supporting device 200 that carries out the manufacturing support of the wire harness 500, and an information processing terminal 300 that supports the wiring work of the wire harness 500. The designing supporting device 100 and the manufacturing supporting device 200, as well as the designing supporting device 100 and the information processing terminal 300 are connected so that information can be communicated by way of a dedicated information communication line or a known information communication network.

The designing supporting device 100 carries out the designing of the wire harness 500 in a design space, which is a virtual space. The designing supporting device 100 is an information processing device such as a personal computer, a server, and the like comprising a CPU (Central Processing Unit), a ROM, a RAM, an input/output interface, and the like.

As shown in FIG. 1, a program stored in a storage device such as the ROM, and the like described above cooperatively operates the CPU, the ROM, the RAM, and the input/output interface, and causes them to function as a space arranging section 101, a guide arranging section 105, a routing section 111, a line organizing section 116, a wire harness defining section 121 (hereinafter also referred to as "harness defining section 121"), a wire harness information section 126 (hereinafter also referred to as "harness information section 126"), a binding member information section 131, a harness digital board information section 136 (hereinafter also referred to as "board information section 136"), a size information section 141, a manufacturing information section 146, a gauge information section 151, and a step information section 156.

Figure 3:
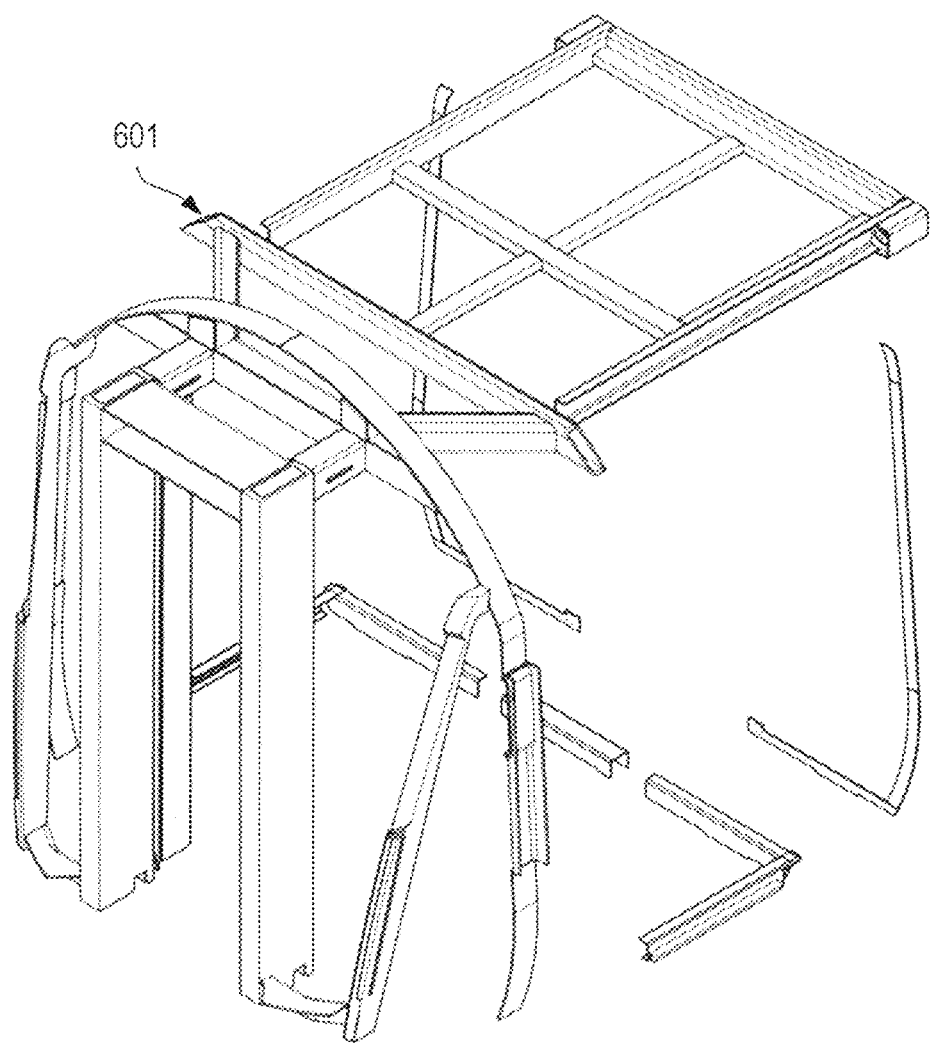
FIG. 3 is a view describing a model of a vehicle generated based on 3D CAD data.

The space arranging section 101 carries out an arithmetic processing of arranging a virtual space 611 (see FIG. 4), where the electrical wire 501 is to be arranged, with respect to a model 601 (see FIG. 3) of the vehicle body generated in the design space, which is a virtual 3D space. The content of the arithmetic processing in the space arranging section 101 will be described below.

The model 601 of the vehicle body is generated based on 3D CAD (Computer Aided Design) data (3D design data).

The 3D CAD data comprises at least part shape information, which is information on a shape of a structural part configuring the vehicle body, part position information, which is information on a position where the structural part is arranged in the vehicle body, device position information, which is information on a position where the device arranged in the vehicle body is arranged, and connecting position information, which is a position where the electrical wire 501 is connected in the relevant device.

Figure 4:
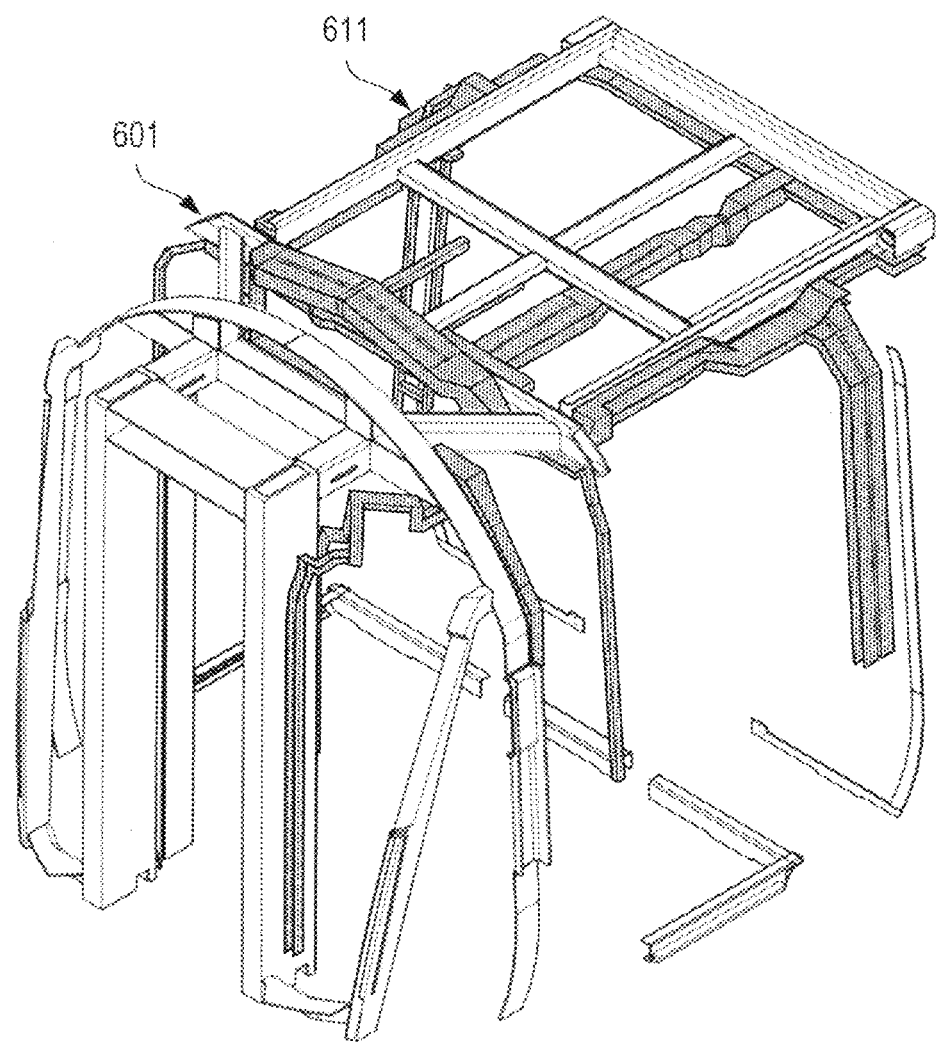
FIG. 4 is a view describing a virtual space generated based on virtual space information.

The virtual space 611 is generated based on the virtual space information. The virtual space 611 is a virtual space set in the design space, and is a space set between the structural parts configuring the vehicle body. In FIG. 4, such space is indicated by hatching with dots in the virtual space 611.

The virtual space information comprises at least space shape information, which is information related to the shape of the virtual space 611, and space position information, which is information on a position where the virtual space 611 is arranged.

Figure 5:
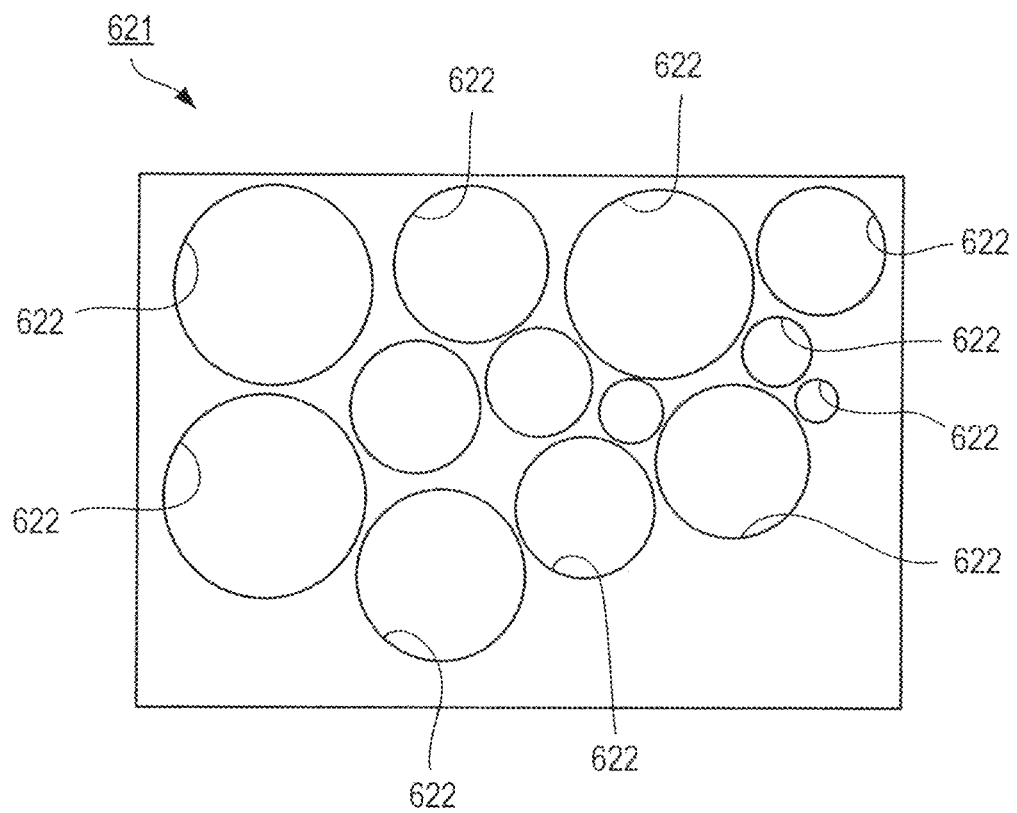
FIG. 5 is a schematic view describing a configuration of a guide section arranged in the virtual space.
Figure 6:
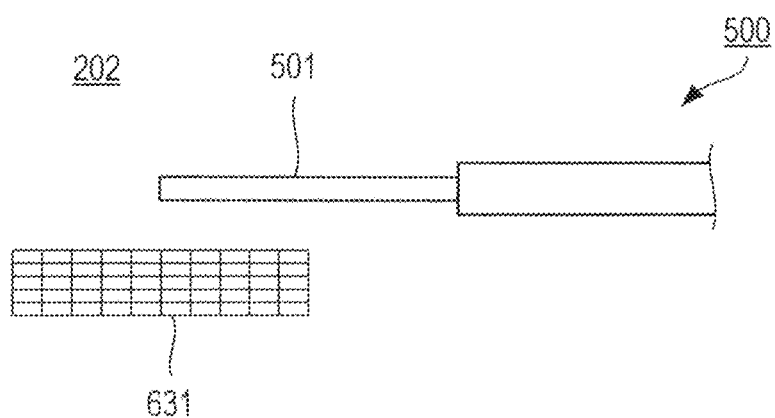
FIG. 6 is a schematic view describing a mode in which a tolerance gauge is displayed.

The guide arranging section 105 carries out an arithmetic processing of arranging a guide section 621 in the virtual space 611. The content of the arithmetic processing in the guide arranging section 105 will be described below. As shown in FIG. 5, the guide section 621 is a virtual plate-shaped member arranged in the virtual space 611. The guide section 621 comprises a guide hole 622, through which the electrical wire 501 is inserted. As shown in FIG. 6, a position to arrange the electrical wire 501 is defined by inserting the electrical wire 501 to the guide hole 622. The electrical wire 501 inserted to the guide hole 622 is, for example, defined at the time of the arrangement of the electrical wire 501.

The shape of the guide section 621 is not limited to the shape shown in FIG. 5, and may be defined based on a cross-sectional shape of the virtual space 611 where the guide section 621 is arranged. Similarly, the size of the guide hole 622 may be defined based on a diameter of the electrical wire 501 to be inserted. The position where the guide hole 622 is formed in the guide section 621 may also be defined so that the plurality of electrical wires 501 forming the wire harness 500, to be described below, are adjacent.

The routing section 111 creates wiring path information, which is information on a path in which the electrical wire 501 is arranged in the virtual space 611, based on the wiring information. The content of the arithmetic processing in the routing section 111 will be described below. The wiring path information is also indicated as harness routing data. The wiring path information also comprises figure information for displaying a 3D shape of the electrical wire 501 arranged in the design space.

The wiring information is also indicated as From To list. The wiring information comprises at least device specifying information, which is information specifying a device (not shown) to which the electrical wire 501 is connected, information specifying a type of the relevant electrical wire 501, length information, which is information representing the length of the relevant electrical wire 501, tolerance information, which is a range of error defined in advance with respect to a value of the length defined for the relevant electrical wire 501, diameter information, which is information representing the diameter of the relevant electrical wire 501, and label character information to be given to the relevant electrical wire 501.

The length information described above may not be included in the wiring information in an initial state, and information on a target length of electrical wire 501 may be included instead of the length information.

If the length information described above is not included in the wiring information, the length information of the electrical wire 501 obtained by the harness information section 126, to be described below, is included in the wiring information as the length information. Furthermore, if the information on a target length is included in the wiring information, the length information of the electrical wire 501 obtained by the harness information section 126 is overwritten.

The initial state is a state from when the wiring information is created until the length information of the electrical wire 501 obtained by the harness information section 126 is included in the wiring information or is overwritten.

The line organizing section 116 carries out an arithmetic processing of organizing the electrical wires 501 arranged in the virtual space 611. The content of the arithmetic processing in the line organizing section 116 will be described below.

The harness defining section 121 carries out an arithmetic processing of bundling the electrical wires 501 arranged in the virtual space 611 to define the wire harness 500. The content of the arithmetic processing in the harness defining section 121 will be described below.

The harness information section 126 carries out an arithmetic processing of creating wire harness information (2D design data) for the defined wire harness 500. The content of the arithmetic processing in the harness information section 126 will be described below. The created wire harness information is used for approval process of the designed wire harness 500, and the manufacturing of the wire harness 500.

The binding member information section 131 carries out an arithmetic processing of creating binding member information comprising length, that is, a usage amount (information related to dimension of the binding member) of the binding member 503 used for the wire harness 500 based on the 3D CAD data and the wire harness information. The binding member 503 may be an adhesive tape. The created binding member information is information that can be output as list format data. The content of the arithmetic processing in the binding member information section 131 will be described below.

The board information section 136 carries out an arithmetic processing of creating harness digital board information based on the wire harness information. The harness digital board information is information comprising figure information displayed on a harness digital board 201, to be described below.

The size information section 141 carries out an arithmetic processing of setting size information related to the size of a board display section 202, to be described below. The board display section 202 is also an arranging surface on which the electrical wire 501 is placed when creating the wire harness 500 in the harness digital board 201.

The manufacturing information section 146 carries out an arithmetic processing of creating manufacturing information (information indicating manufacturing method) comprising the figure information used for the manufacturing of the wire harness 500 based on the harness digital board information and the size information. The figure information is information displayed on the board display section 202 in the harness digital board 201.

The gauge information section 151 carries out an arithmetic processing of creating gauge information, which is information of a tolerance gauge 631, based on the tolerance information included in the wiring information. The gauge information is information for displaying the tolerance gauge 631 on the board display section 202, and the created gauge information is included in the figure information.

As shown in FIG. 6, the tolerance gauge 631 represents an acceptable range of a position where one end and another end of the electrical wire 501 are to be arranged when the electrical wire 501 is arranged on the board display section 202 of the harness digital board 201.

The step information section 156 carries out an arithmetic processing of creating wiring step information corresponding to a wiring step of the wire harness 500 based on the wire harness information and the wiring information. The wiring step information is information that allows a display corresponding to the wiring step of the wire harness 500 on a terminal display section 321 of the information processing terminal 300. For example, it is information that can display the order of the branch line 513 or the connector 502 of the wire harness 500 to carry out the wiring work, display a 3D figure of the wire harness 500 and highlight display the branch line 513 to carry out the wiring work. Furthermore, the step information section 156 may carry out an arithmetic processing of creating the wiring step information based on the wiring path information. The step information section 156 may carry out an arithmetic processing of creating the wiring step information based on the wiring path information and the harness 3D information, to be described below.

In the present embodiment, an example in which one designing supporting device 100 functions as the space arranging section 101, the guide arranging section 105, the routing section 111, the line organizing section 116, the harness defining section 121, the harness information section 126, the binding member information section 131, the board information section 136, the size information section 141, the manufacturing information section 146, the gauge information section 151, and the step information section 156 will be described, but such functions may be distributed to a plurality of designing supporting devices 100.

For example, a first designing supporting device 100 may function as the space arranging section 101, the guide arranging section 105, the routing section 111, the line organizing section 116, the harness defining section 121, the harness information section 126, and the binding member information section 131, and the second designing supporting device 100 may function as the board information section 136, the size information section 141, the manufacturing information section 146, the gauge information section 151, and the step information section 156. The first designing supporting device 100 and the second designing supporting device 100 may be directly connected so as to be able to communicate information, or may be connected so as to be able to communicate information through a server.

Figure 7:
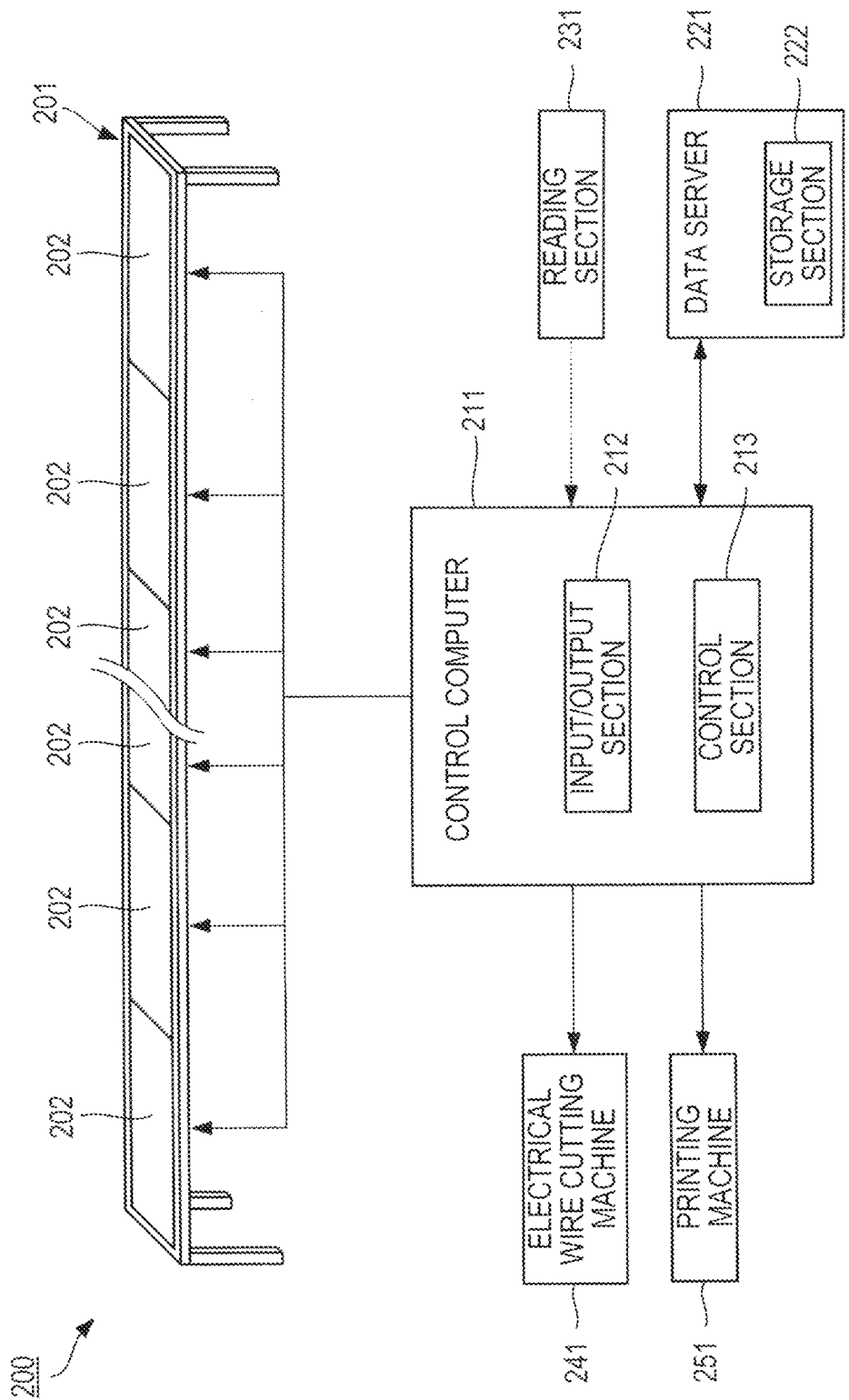
FIG. 7 is a schematic view describing a configuration of a manufacturing supporting device.

The manufacturing supporting device 200 manufactures the wire harness 500. As shown in FIGS. 2 and 7, the manufacturing supporting device 200 comprises the harness digital board (harness board) 201, a control computer 211, and a data server 221. Furthermore, the manufacturing supporting device 200 also comprises devices used for the manufacturing of the wire harness 500 comprising a reading section 231, an electrical wire cutting machine 241, and a printing machine 251.

The harness digital board 201 is formed to a desk shape used for the manufacturing of the wire harness 500. The harness digital board 201 comprises the board display section 202, which is also a work table on which the wire harness 500 is manufactured.

The board display section 202 is a surface having a width and a length necessary for the manufacturing of the wire harness 500. The board display section 202 is a surface on which the wire harness 500 is manufactured, and is also a display surface on which figure information, which is digital information, is displayed. The board display section 202 is connected to the control computer 211 so as to be able to communicate information, where information related to the figure information to display is transmitted from the control computer 211. The control computer 211 may read the manufacturing information comprising the figure information from the data server 221.

In the present embodiment, an example in which the display surface of the board display section 202 is a liquid crystal display will be described. The display surface of the board display section 202 is not limited to the liquid crystal display mentioned above, and may be an organic EL (Electroluminescence) display, or may be a projection surface to which the figure information is projected by a projector.

The reading section 231 optically reads an identifier such as a bar code displayed on the display surface of the board display section 202. The reading section 231 is connected to the control computer 211 so as to be able to communicate information, and outputs the information on the read identifier to the control computer 211.

In the present embodiment, an example in which the reading section 231 is a portable size and weight, and is connected to the control computer 211 so as to be able to communicate information using a known wireless communication technique will be described. The identifier may be a known method or a format.

The electrical wire cutting machine 241 cuts the electrical wire 501 used for the manufacturing of the wire harness 500 to a desired length defined in advance. The electrical cutting machine 241 is connected to the control computer 211 so as to be able to communicate information, and cuts the electrical wire 501 based on a control signal input from the control computer 211. The cut electrical wire 501 is fed out from a supply reel (not shown).

The printing machine 251 prints a label to be attached to the cut electrical wire 501 and the wire harness 500. The label is used for identification, and the like of the electrical wire 501. The printing machine 251 is connected to the control computer 211 so as to be able to communicate information, and prints the label based on the information input from the control computer 211.

The control computer 211 controls the display of the figure information in the harness digital board 201. Furthermore, the control computer 211 acquires information related to control of other devices such as the electrical wire cutting machine 241 and the printing machine 251 used for the manufacturing of the wire harness 500, and the manufacturing of the wire harness 500 such as work history and examination results.

In the present embodiment, an example in which the control computer 211 is an information processing device such as a personal computer, and the like comprising a CPU, a ROM, a RAM, an input/output interface, and the like will be described.

As shown in FIG. 7, a program stored in a storage device such as the ROM, and the like described above cooperatively operates the CPU, the ROM, the RAM, and the input/output interface, and causes them to function as an input/output section 212 and a control section 213.

The input/output section 212 is connected to the designing supporting device 100, the board display section 202, the reading section 231, the electrical wire cutting machine 241, the printing machine 251, and the data server 221 so as to be able to communicate information. In the present embodiment, an example in which the board display section 202, the electrical wire cutting machine 241, the printing machine 251, and the data server 221 are connected so as to enable wired information communication by a known method using a LAN (Local Area Network) cable, and the like, and connected to the reading section 231 so as to enable wireless information communication by a known method such as a wireless LAN, and the like will be described. An example in which connection with the designing supporting device 100 is carried out such that information can be communicated using a known information communication network will be described.

The control section 213 generates a control signal for controlling the operations of the board display section 202, the electrical wire cutting machine 241, and the printing machine 251. Furthermore, information related to the manufacturing of the wire harness 500 such as work history, examination results, and the like are stored in the data server 221.

The data server 221 is a server connected to the control computer 211 so as to be able to communicate information through the information communication network configured by the LAN cable, and the like. In the present embodiment, an example in which the data server 221 is an information processing device such as a server, and the like comprising a CPU, a ROM, a RAM, an input/output interface, and the like will be described.

As shown in FIG. 7, a program stored in a storage device such as the ROM, and the like described above cooperatively operates the CPU, the ROM, the RAM, and the input/output interface, and causes them to function as a storage section 222. Furthermore, information related to the manufacturing of the wire harness 500 such as work history, examination result, and the like acquired by the control computer 211 are stored in the storage section 222. The storage section 222 may store the manufacturing information comprising the figure information.

The information processing terminal 300 displays information supporting the wiring work of the wire harness 500. In the present embodiment, an example in which the information processing terminal 300 is a table type or a notebook type information processing device that can be carried and moved by a worker comprising a CPU, a ROM, a RAM, an input/output interface, and the like will be described.

As shown in FIG. 1, a program stored in a storage device such as the ROM, and the like described above cooperatively operates the CPU, the ROM, the RAM, and the input/output interface, and causes them to function as a terminal storage section 301, a terminal control section 311, and a terminal display section 321.

The terminal storage section 301 stores the wiring step information and the wiring path information acquired from the designing supporting device 100. The terminal control section 311 carries out a control of displaying the wiring step information corresponding to the wiring step of the wire harness 500 and the wiring path information. The control content by the terminal control section 311 will be described below.

The terminal display section 321 displays the wiring step information and the wiring path information with respect to a worker carrying out the wiring work. Furthermore, the terminal display section 321 is also an input section such as a touch screen to which the operation on the information processing terminal 300 by the worker is input. In the present embodiment, an example in which the terminal display section 321 is a combination of a liquid crystal display and a touch screen will be described.

Figure 8:
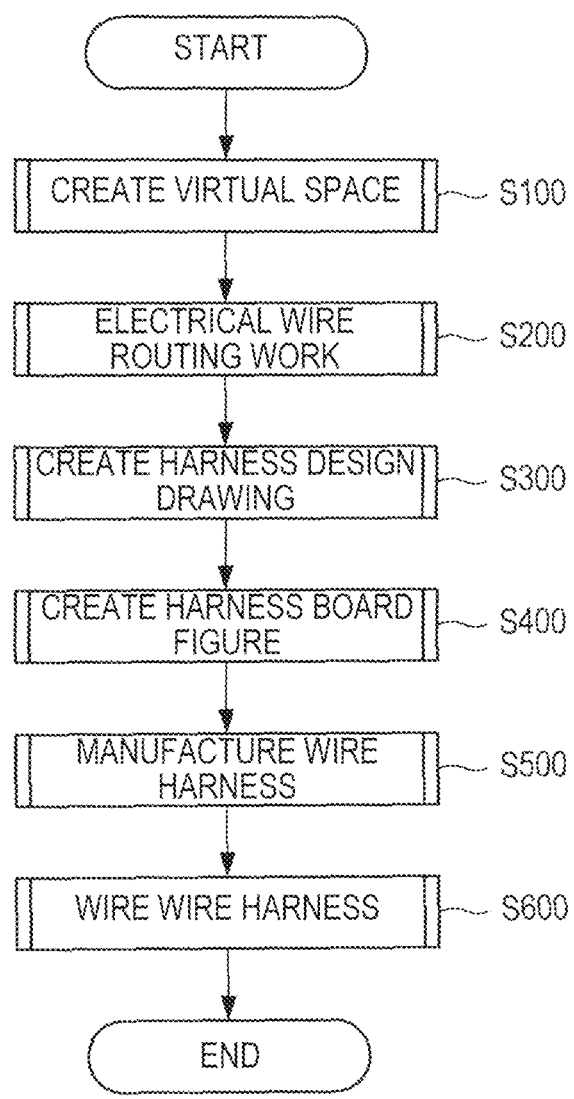
FIG. 8 is a flowchart describing a wiring supporting method of the wire harness by the wiring supporting system.

Next, the total supporting method of the wire harness 500 in the total supporting system 1 having the configuration described above will be described with reference to FIGS. 8 to 14. When the wiring support of the wire harness 500 is started in the total supporting system 1 of the present embodiment, the designing supporting device 100 carries out a virtual space creating process (S100: designing supporting step) as shown in FIG. 8.

Figure 9:
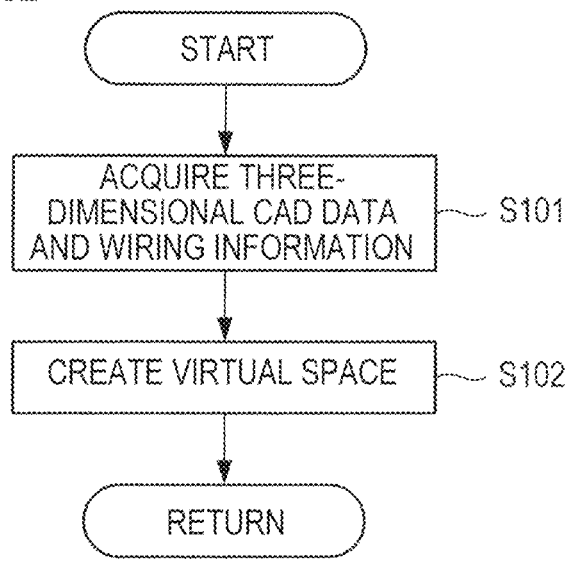
FIG. 9 is a flowchart of a sub-routine describing a method of creating a virtual space.

As shown in FIG. 9, the designing supporting device 100 carries out a process described below for the virtual space creating process. First, the designing supporting device 100 carries out a process of acquiring the 3D CAD data and the wiring information (S101). The designing supporting device 100 transmits a signal requesting for the output of the 3D CAD data and the wiring information to the server, and the like storing the 3D CAD data and the wiring information in advance. The 3D CAD data and the wiring information output in response to the output request signal are input and stored in the designing supporting device 100.

After acquiring the 3D CAD data and the wiring information, the designing supporting device 100 carries out a process of creating the virtual space 611 based on the part information of the model 101 of the vehicle body (S102). The shape of the virtual space 611 is defined with reference to the model 601 of the vehicle. For example, the virtual space 611 is arranged between the structural parts configuring the vehicle body of the vehicle. Furthermore, the virtual space 611 is arranged at a position where the electrical wire 501 can be connected to the device arranged on the vehicle body.

The designing supporting device 100 creates virtual space information comprising the space shape information, which is information related to the shape of the virtual space 611, and the space position information, which is information on a position where the virtual space 611 is arranged.

The created virtual space 611 is checked for presence/absence of interference with the vehicle body, and the like. If interference is found, the virtual space creating process is terminated. The designing supporting device 100 of the total supporting system 1 then returns to FIG. 8 and carries out a process of electrical wire routing work (S200: designing supporting step).

Figure 10:
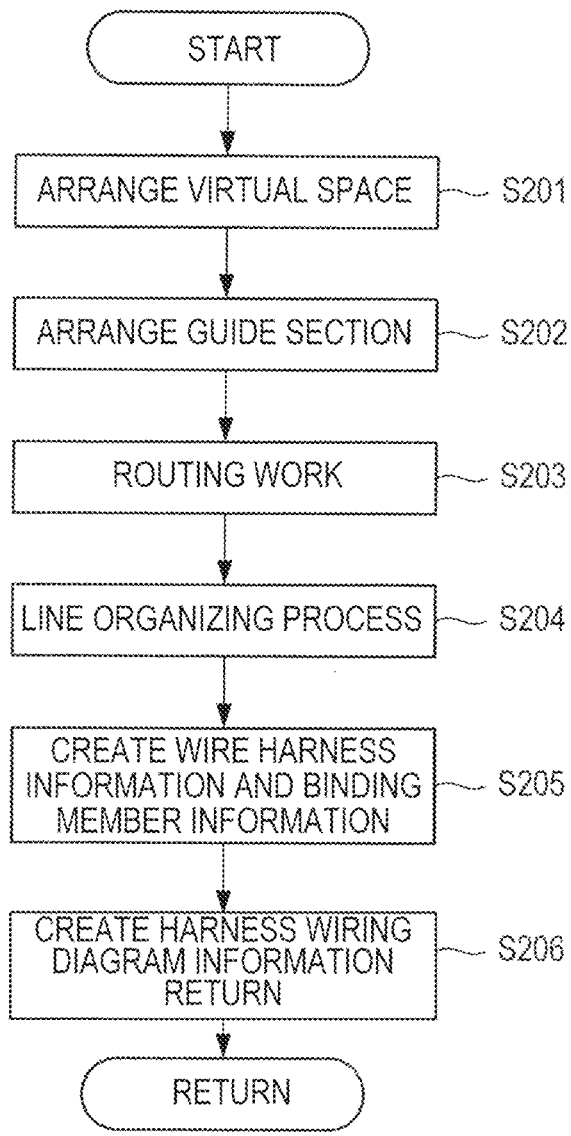
FIG. 10 is a flowchart of a sub-routine describing a method of an electrical wire routing work.

As shown in FIG. 10, the designing supporting device 100 carries out a process described below for the process of electrical wire routing work. First, the space arranging section 101 of the designing supporting device 100 carries out a process of arranging the model 601 of the vehicle and the virtual space 611 in the design space (S201). The model 601 of the vehicle body is generated in the design space based on the 3D CAD data. The virtual space 611 is a space approved by the virtual space creating process of S100, and is generated in the design space based on the virtual space information.

After the model 601 of the vehicle and the virtual space 611 are arranged, the guide arranging section 105 of the designing supporting device 100 carries out a process of arranging the guide section 621 in the virtual space 611 (S202). The position where the guide section 621 is arranged includes a turning corner of the virtual space 611, a branched point where the virtual space 611 is branched, and vicinity of a tapered portion where a cross-sectional area of the virtual space 611 is increased or decreased.

The process of setting the shape of the guide section 621, as well as the size and the arranging position of the guide hole 622 may be carried out at the same time as the process of arranging the guide section 621, or may be carried out before the process of S202. When carrying out the process of setting the shape of the guide section 621, and the like before the process of S202, the relevant setting process may be carried out in a computer different from the designing supporting device 100. In this case, the shape of the guide section 621, and the like set by the relevant setting process are input to the designing supporting device 100 when carrying out the process of S202.

After the guide section 621 is arranged, the routing section 111 of the designing supporting device 100 carries out a routing work, which is a process of wiring the electrical wire 501 in the virtual space 611 (S203). The routing work is also indicated as a 3D wiring design. The wiring path information comprising the figure information for displaying the 3D shape of the electrical wire 501 is created by the routing work and the line organizing process, to be described below.

The process of wiring the electrical wire 501 is carried out based on the device specifying information included in the wiring information, the device position information the connecting position information, and the like included in the 3D CAD data. That is, a device to be connected to a starting point (From), which is one end of a predetermined electrical wire 501, and a device to be connected to an ending point (To), which is the other end, are specified based on the wiring information. The positions for arranging the specified device on the starting point side and the device on the ending point side, and the position to which the electrical wire 501 is connected in the relevant device are specified. The routing section 111 carries out a process of wiring so as to connect the electrical wire 501 to the specified device via the virtual space 611. In this case, the electrical wire 501 is inserted to the set guide hole 622 of the guide section 621.

After the routing work is carried out, the line organizing section 116 of the designing supporting device 100 carries out the line organizing process (S204). In the line organizing process, an adjustment process of when the electrical wire 501 cannot be completely fitted into the virtual space 611, and a process of organizing the electrical wires 501 arranged at an area where the virtual space 611 is bent and an area extended linearly are carried out. First, the adjustment process of when the electrical wire 501 cannot be completely fitted into the virtual space 611 will be described.

The line organizing section 116 carries out a determination on whether the electrical wire 501 can be fitted into the virtual space 611 in the following manner. First, an arrangement section shape, which is a shape in a predetermined region or an area for carrying out the determination of the virtual space 611, and an electrical wire shape, which is a shape of the electrical wire 501 arranged in the predetermined region based on the wiring information, are acquired based on the virtual space information. Next, whether the electrical wire 501 interferes with a boundary surface, which is a boundary of the inner side and the outer side of the virtual space 611, in the predetermined region is determined based on the arranging section shape and the electrical wire shape. If determined to interfere, a determination is made that the electrical wire 501 cannot be fitted into the virtual space 611. If determined to not interfere, determination is made that the electrical wire 501 cannot be fitted into the virtual space 611.

The line organizing section 116 carries out at least one of the line organizing processes described below when determined that the electrical wire 501 cannot be fitted into the virtual space 611. When determined that the electrical wire 501 can be fitted into the virtual space 611, such line organizing processes are not carried out.

In a first line organizing process, a process of widening the virtual space 611 determined that the electrical wire 501 cannot be fitted therein is carried out. An extra space defined in advance is ensured between the model 601 of the vehicle body and the virtual space 611, and the process of widening the virtual space 611 to the extra space is carried out.

In a second line organizing process, a process of circumventing some electrical wires 501 determined to not fit into the virtual space 611 to a different wiring route is carried out. In other words, the process of circumventing the electrical wire to another virtual space 611 different from the virtual space 611, to which determination is made that the electrical wire 501 cannot be fitted, is carried out.

In a third line organizing process, a process of changing the arranging position of the arranged electrical wire 501 in the determined virtual space 611 is carried out. When a plurality of electrical wires 501 having different diameters are arranged in the virtual space 611, determination may be made that all the electrical wires 501 cannot be fitted in the virtual space 611 as many gaps are formed in between. In this case, all the electrical wires 501 may be fitted in the virtual space 611 by changing the arranging positions of the electrical wires 501 and reducing the gap between the electrical wires 501.

A fourth line organizing process is a process carried out when it is determined that the electrical wire 501 cannot be fitted in the virtual space 611 even after the first line organizing process to the third line organizing process are carried out. In the present line organizing process, a process of changing the shape of the structural part configuring the vehicle body of the vehicle, and the arrangement of the device to which the electrical wire 501 is connected is carried out. The change to widen the virtual space 611 can be made by changing the shape of the structural part, and hence all the electrical wires 501 may be fitted in the virtual space 611. Furthermore, the route for arranging the electrical wire 501 is changed by changing the arrangement of the device, and hence all the electrical wires 501 may be fitted in the virtual space 611.

The first line organizing process to the fourth line organizing process may be carried out when the line organizing section 116 determines that the electrical wire 501 cannot be fitted in the virtual space 611, or may be carried out when the worker inputs the execution of the process.

Next, a process of organizing the electrical wire 501 arranged at the area where the virtual space 611 is bent and at the area extended linearly will be described. In the present embodiment, description will be made for when applied to an example in which the relevant process is carried out when the worker inputs the execution, but the line organizing section 116 may determine whether to execute the relevant process.

When the execution of the relevant process is input by the worker, the line organizing section 116 carries out the process of organizing the arranging state of the electrical wire 501. For example, a process of arranging the electrical wires 501 in parallel with a center line of the virtual space 611, a process of having a distance with an adjacent electrical line 501 to within a desired range, and the like are carried out.

After the line organizing process is carried out, the designing supporting device 100 carries out a process of creating the wire harness information and the binding member information (S205). First, a process of defining the wire harness 500 carried out by the harness defining section 121 of the designing supporting device 100 is carried out. Thereafter, the process of creating the wire harness information by the harness information section 126 and the process of creating the binding member information by the binding member information section 131 are carried out.

The harness defining section 121 carries out an arithmetic processing of bundling a predetermined number of electrical wires 501 and defining the wire harness 500. The predetermined number of electrical wires 501 are selected according to a predetermined rule from the plurality of electrical wires 501 arranged in the virtual space 611.

The predetermined rule comprises having the number of electrical wires 501 to bundle into one wire harness 500 limited to for example, one hundred, bundling the electrical wires 501 connected to the same device into the wire harness 500, selecting the electrical wires 501 to bundle into the wire harness 500 based on the electrical type, and the like. A method of selecting based on the electrical type comprises a method of selecting that of the same type (e.g., alternating current electrical wire, direct current electrical wire, shield line) of electrical wire 501.

After the process of defining the wire harness 500 is carried out, the harness information section 126 carries out a process of creating the wire harness information based on the harness 3D information, which is the information on the 3D shape of the wire harness 500. The harness 3D information is the information based on the wiring path information of the electrical wire 501 configuring the wire harness 500.

The wire harness information is the information related to the shape of the wire harness 500 such as the length information of the main line 511 of the wire harness 500, the position information of the branched point 512, the length information of the branch line 513, and the like. The wire harness information also comprises the information that can display the wire harness 500 as the 2D figure.

Furthermore, the wire harness information comprises the information related to the electrical wire 501 configuring the wire harness 500 such as the information specifying the electrical wire 501 configuring the wire harness 500, the length information of the relevant electrical wire 501, the diameter information of the electrical wire 501, the information specifying the electrical wire 501 configuring the branch line 513, and the like.

The binding member information section 131 carries out an arithmetic process of creating the binding member information based on the 3D CAD data, the wire harness information, and the like. The binding member information comprises the length (information related to the dimension of the binding member), that is, the usage amount of the adhesive tape serving as the binding member 503 used for the wire harness 500.

First, the binding member information section 131 acquires the binding position of bundling and binding the plurality of electrical wires 501, the type of binding member 503 used for the binding, and the binding member arranging information, which is the information on the number of winding or the number of times to wind the binding member 503 at the binding position. Such information may be input by the worker or may be acquired from the information stored in advance.

The binding member information section 131 carries out a process of calculating the outer diameter of the bundle (wire harness 500) of the electrical wire 501 at the binding position based on the information of the binding position and the diameter information of the electrical wire 501.

After calculating the value of the outer diameter, the binding member information section 131 carries out the process of multiplying the value of the outer diameter and the number of winding. Through such multiplication, the length (usage amount) of the binding member 503 used at the binding position is obtained. The process of obtaining the usage amount is carried out for every binding position.

After the usage amount of the binding member 503 is obtained for all the binding positions in the wire harness 500, the binding member information section 131 creates the binding member information comprising information such as the information specifying the wire harness 500, the binding position, the type of binding member 503, the number of windings, the usage amount, and the like. The binding member information is created as data that can be output having a known format.

After the binding member information is created, the designing supporting device 100 carries out a process of creating the harness wiring diagram information (2D design data) (S206). The harness wiring diagram information is the information of the 2D figure related to the wire harness 500, and is the information on the figure indicating how to wire the wire harness 500 with respect to the vehicle body.

After the harness wiring diagram information is created, the process of the electrical wire routing work is terminated. The designing supporting device 100 of the total supporting system 1 then returns to FIG. 8 and carries out a harness design drawing creating process (S300: designing supporting step).

Figure 11:
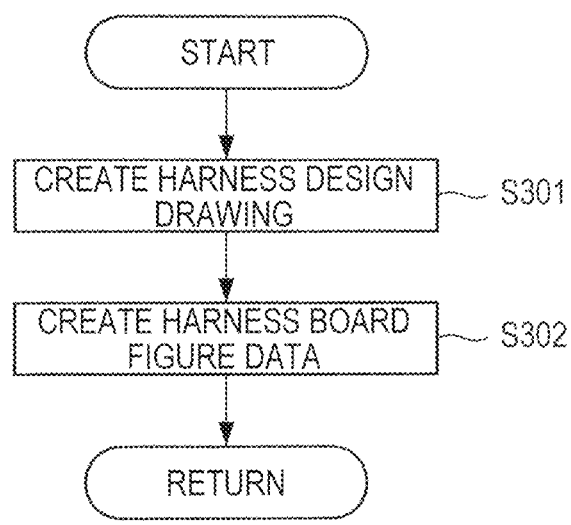
FIG. 11 is a flowchart of a sub-routine describing a method of creating a harness design drawing.

As shown in FIG. 11, the designing supporting device 100 carries out a process described below for the harness design drawing creating process. First, the designing supporting device 100 carries out the process of creating the harness design drawing (2D design data) based on the wiring information and the wire harness information (S301). The harness design drawing may be created based on the harness wiring drawing information instead of the wire harness information.

The harness design drawing is created in units of wire harness, and is created to a size (e.g., A3 size) defined in advance. One wire harness 500 is shown in one figure (figure of one part number). However, in the case of a large wire harness 500, the wire harness 500 may be divided and shown over a plurality of figures (figures of a plurality of part numbers).

The harness design drawing is described in full scale (1/1 scale) in which the shape of the wire harness 500 is the same size as the actual wire harness 500. However, the shape is deformed (changed/reduced) to show the shape of the wire harness 500 within a frame of a predefined paper size (e.g., A3 size).

The designing supporting device 100 carries out a computation of obtaining the reduction scale of the harness design diagram, the angle of the branch line 513 branched with respect to the main line 511, and the like based on the actual length of the wire harness 500, the predefined paper size, and the like, and outputs the same as the harness design drawing.

When the harness design drawing is divided into a plurality of drawings, the designing supporting device 100 carries out a computation of obtaining the reduction scale, the angle of the branch line 513 branched with respect to the main line 511, and the like based on the number of drawings the drawing is further divided into.

After the harness design diagram is created, the board information section 136 of the designing supporting device 100 carries out a process of creating the harness digital board information (harness board figure data) (S302). The harness digital board information comprises, for example, information on the 2D figure of the wire harness 500 created based on the wire harness information, information specifying the electrical wire 501 configuring the wire harness 500, and information specifying the connector 502 attached to the electrical wire 501.

After the harness design drawing and the harness digital board information are created, the harness design drawing creating process is terminated. The designing supporting device 100 of the total supporting system 1 then returns to FIG. 8 and carries out a harness board figure creating process (S400: manufacturing supporting step).

Figure 12:
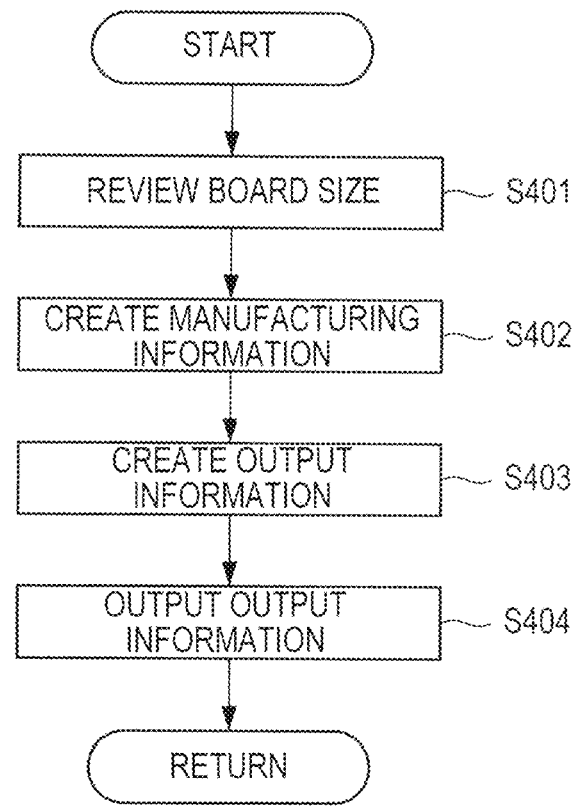
FIG. 12 is a flowchart of a sub-routine describing a method of creating a harness board figure.

As shown in FIG. 12, the designing supporting device 100 carries out a process described below for the harness board figure creating process. First, the size information section 141 of the designing supporting device 100 carries out a process of reviewing the board size (S401).

The size information section 141 carries out an arithmetic processing of setting size information related to the size of the board display section 202. The board display section 202 is a display surface on which the figure information, to be described below, is displayed, and is also an arranging surface on which the electrical wire 501 is placed when creating the wire harness 500 in the harness digital board 201.

After the size information is set, the manufacturing information section 146 of the designing supporting device 100 carries out a process of creating the manufacturing information comprising the figure information (S402). The figure information is information displayed on the board display section 202 in the harness digital board 201.

The wire harness 500 displayed by the figure information is displayed with the same length (full scale or 1/1 scale) as the actual wire harness 500 in the length direction of the wire harness 500.

The same length means satisfying the following equation (1), where L is the length of the actual wire harness 500 and L2 is the length of the displayed wire harness 500. That is, an absolute value of a difference of the length L1 of the actual wire harness 500 and the length L2 of the displayed wire harness 500 is to be smaller than 0.1% with respect to the length L1 of the actual wire harness 500.

$$\frac{|L1 - L2|}{L1} \times 100 < 0.1 \quad (1)$$

With respect to the radial direction or the width direction of the wire harness 500, display may be made on the board display section 202 with the same thickness or the same diameter as the actual wire harness 500. In this case, from what extent of thickness of the cable the wire harness 500 is configured can be visually recognized.

Furthermore, compared to when not displayed with the same thickness or the same diameter, the worker can easily notice if the number of electrical wires 501 arranged on the board display section 202 is too much or too little when producing the wire harness 500. As a result, the work mistake in producing the wire harness 500 can be easily reduced.

The same thickness or the same diameter means satisfying the following equation (2), where D1 is the thickness of the actual wire harness 500 and D2 is the thickness of the displayed wire harness 500. That is, an absolute value of a difference of the thickness D1 of the actual wire harness 500 and the thickness D2 of the displayed wire harness 500 is to be smaller than 1% with respect to the thickness D1 of the actual wire harness 500.

$$\frac{|D1 - D2|}{D1} \times 100 < 1 \quad (2)$$

On the other hand, for the radial direction or the width direction of the wire harness 500, display of the size not based on the actual wire harness 500 may be made. In this case, in particular, the figure information can be easily created by having the size in the radial direction (width direction) in all the main lines 511 and the branch lines 513 displayed on the board display section 202 the same.

For example, the thickness D2 of the displayed wire harness 500 may be greater (thicker) than the thickness D1 of the actual wire harness 500. Specifically, the absolute value of the difference of the thickness D1 of the actual wire harness 500 and the thickness D2 of the displayed wire harness 500 may be greater than or equal to 1% with respect to the thickness D1 of the actual wire harness 500.

When the thickness D2 of the displayed wire harness 500 is displayed large, the displayed wire harness 500 is less likely to be hidden by the arranged electrical wire 501 even if the electrical wire 501 is arranged on the board display section 202. Thus, the workability when producing the wire harness 500 can be easily enhanced.

However, the shapes of the main line 511 and the branch line 513 are changed to display the wire harness 500 within the frame of the size defined by the size information. There is also a case where the plurality of wire harnesses 500 are simultaneously displayed on the board display section 202.

After the manufacturing information is created, the gauge information section 151 of the designing supporting device 100 carries out an arithmetic processing of creating gauge information, which is information of the tolerance gauge 631. The gauge information is the information for displaying the tolerance gauge 631 on the board display section 202. The created gauge information is included in the figure information.

As shown in FIG. 6, the tolerance gauge 631 represents an acceptable range of a position where the starting point, which is one end, or the ending point, which is the other end, of the electrical wire 501 are to be arranged when the electrical wire 501 is arranged on the board display section 202 of the harness digital board 201. The position for displaying the tolerance gauge 631 may be specified by the gauge information section 151 or the worker may change or specify the displaying position.

In the present embodiment, an example in which the tolerance gauge 631 is displayed as a grid configured by a frame of a predetermined pitch. The predetermined pitch may be a pitch of 5 mm. The tolerance gauge 631 shown in FIG. 6 displays a positive tolerance and a negative tolerance. In addition, only the positive tolerance or only the negative tolerance may be displayed.

A display mode of the tolerance gauge 631 merely needs to have the tolerance range made clear, and is not limited to the display mode serving as the grid like the tolerance gauge 631 of the present embodiment. For example, it may be a combination of line segments, or may be a display mode of only a large frame or the outer frame of the grid.

After the manufacturing information is created, the designing supporting device 100 carries out a process of creating output information (S403). The output information is information created based on the manufacturing information. The output information comprises the CAD data created from the figure information and the electronic data (e.g., PDF (Portable Document format)) that can display the figure information with various types of information terminals, the material table information, and the wiring information for manufacturing.

After the manufacturing information is created, the designing supporting device 100 carries out an output information outputting process (S404). The created output information is distributed to a production site where the manufacturing supporting device 200 is arranged.

After the distribution to the production site is carried out, the harness board figure creating process is terminated. The total supporting system 1 returns to FIG. 8 and carries out a wire harness manufacturing process (S500: manufacturing supporting step).

Figure 13:
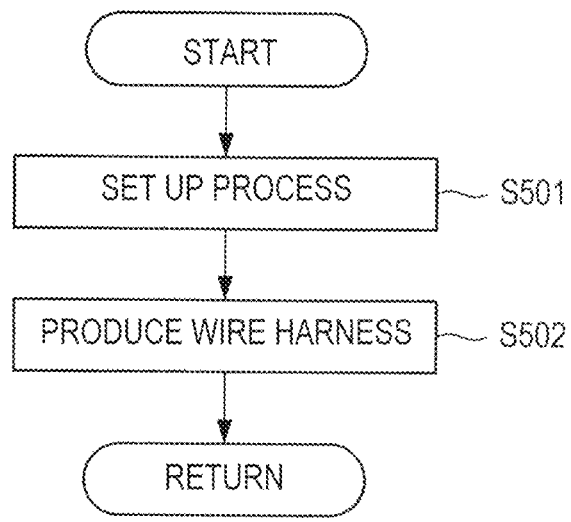
FIG. 13 is a flowchart of a sub-routine describing a method of manufacturing the wire harness.

The manufacturing supporting device 200 of the total supporting system 1 carries out a process described below for the wire harness manufacturing process. First, as shown in FIG. 13, the control computer 211 of the manufacturing supporting device 200 carries out a setup process, which is a production preparation of the wire harness 500, based on the distributed output information (S501).

After the setup process is terminated, the control computer 211 carries out a production process of the wire harness 500 (S502). In the production process, the control computer 211 carries out a process of displaying the figure information corresponding to the production step of the wire harness 500, the gauge information, and the identifier on the board display section 202.

The tolerance gauge 631 displayed by the gauge information is displayed at a predetermined position on the board display section 202 by the control computer 211. Specifically, display is made in the vicinity of the positions where the starting point, which is one end, and the ending point, which is the other end, of the electrical wire 501 are arranged.

The control computer 211 carries out a process of acquiring the information of the identifier read by the reading section 231, and stores the same in the data server 221 with the information specifying the wire harness 500 and the information such as the manufacturing date and time, manufacturing location, and the like. The identifier read by the reading section 231 comprises that comprising information specifying the electrical wire 501 and the connector 502 attached to the electrical wire 501.

Furthermore, the control computer 211 controls the electrical wire cutting machine 241 and the printing machine 251 according to the acquisition of the information of the identifier, and cuts the electrical wire 501 of a desired type to a desired length and supplies the same. The supplied electrical wire 501 is arranged on the board display section 202, and the production of the wire harness 500 is advanced.

The material table information included in the output information is used for preparing members such as the electrical wire 501, the connector 502, and the like necessary for the production of the wire harness 500. The wiring information for manufacturing has the array of information changed in accordance with the processing order at the time of the production of the wire harness 500. The wiring information for manufacturing is also referred to as a recipe.

Figure 14:
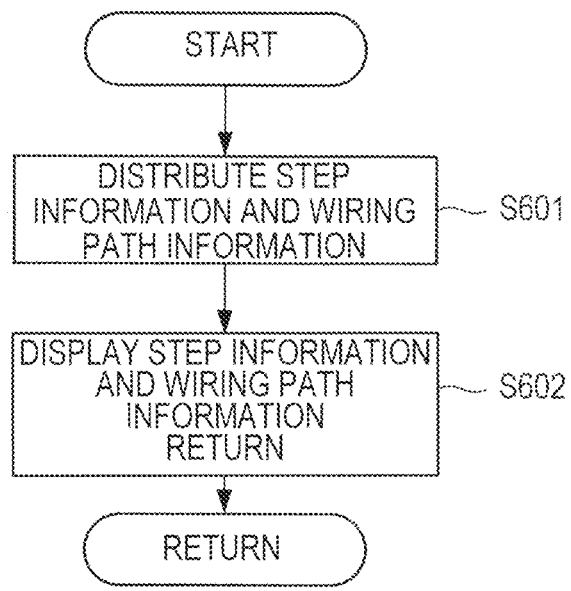
FIG. 14 is a flowchart of a sub-routine describing a method of wiring the wire harness.

After the wire harness manufacturing process is completed, the created wire harness 500 is transported to a site where the vehicle body of the railroad vehicle is being produced. As shown in FIG. 14, the information processing terminal 300 of the total supporting system 1 carries out a process of supporting the wiring of the wire harness 500 (S600: wiring supporting step).

In the process of the wiring supporting of the wire harness 500, the distribution of the wiring step information and the wiring path information from the designing supporting device 100 to the information processing terminal 300 is first carried out (S601). The distributed wiring step information and the wiring path information are stored in the terminal storage section 301.

The terminal control section 311 of the information processing terminal 300 carries out a control of displaying the wiring step information corresponding to the wiring step of the wire harness 500 and the wiring path information (S602). Specifically, it is largely classified as the assembly order STEP of the wire harness 500, and the control for displaying on the terminal display section 321 is carried out according to the order of work.

The information processing terminal 300 can also display the figure information made into electronic data included in the output information on the terminal display section 321. The information processing terminal 300 can be used for the work at the site of wiring. Furthermore, this can also be used for the education on the wiring worker.

According to the total supporting system 1 having the configuration described above, the wire harness 500 can be designed on the design space, which is a virtual space. That is, even in a situation where the actual object of the vehicle body of the railroad vehicle does not exist, the wire harness 500 can be designed, and the time required for designing can be easily reduced. The degree of difficulty of design can be easily lowered compared to when designing the wire harness 500 while measuring the actual object of the vehicle body.

The figure information used for the manufacturing of the wire harness 500 can also be displayed. That is, the wire harness 500 can be manufactured without using the figure of the wire harness 500 printed on a paper, and the degree of difficulty in manufacturing can be easily lowered.

Furthermore, at the time of work for wiring the wire harness 500, the wiring step information corresponding to the wiring step of the wire harness 500 and the wiring path information can be displayed on the portable information processing terminal 300. That is, the information processing terminal 300 can be carried into a place for carrying out the wiring of the wire harness 500, and the wiring step information corresponding to the wiring step can be displayed on the information processing terminal 300 that was carried in. Thus, the checking time of the step can be reduced, and the time required for the work for wiring the wire harness 500 can be easily reduced. Furthermore, the degree of difficulty of the work for wiring the wire harness 500 can be easily lowered.

The wire harness 500 can be easily designed by arranging the electrical wire 501 in the virtual space 611 arranged on the design space compared to when the virtual space 611 is not used. The virtual space 611, which is the region where the electrical wire 501 can be arranged, is set in advance, and thus the worker can concentrate on the selecting work of the path for wiring the electrical wire 501 at the time of the wiring of the electrical wire 501.

The arranging position of the electrical wire 501 in the virtual space 611 can be easily defined by arranging the guide section 621 in the virtual space 611. The design precision of the path for arranging the electrical wire 501 can be easily enhanced by defining the arranging position of the electrical wire 501 compared to when not defining the arranging position.

The interference is reviewed using the arranging section shape obtained based on the virtual space information and the electrical wire shape obtained based on the wiring information, whereby the path for arranging the wire harness 500 can be verified even in a situation where the actual object of the vehicle body of the railroad vehicle does not exist. Thus, even in a situation where the actual object of the vehicle body does not exist, the verification and correction of the wire harness 500 can be carried out, and the time required for the verification and correction can be easily reduced.

The manufacturing of the wire harness 500 is facilitated as the manufacturing information is displayed on the harness digital board 201. The manufacturing information is displayed in full scale of the wire harness 500 to be manufactured, and hence the manufacturing is further facilitated.

With the gauge information included in the figure information, the tolerance gauge 631 based on the gauge information is displayed at the positions where one end and the other end of the electrical wire 501 are arranged on the harness digital board 201. When arranging the electrical wire 501 configuring the wire harness 500 on the harness digital board 201, the arranging position of the electrical wire 501 can be easily determined by referencing the tolerance gauge 631. Thus, the degree of difficulty of manufacturing the wire harness 500 can be easily lowered.

The wiring step information displayed on the information processing terminal 300 is based on at least the wiring path information, and hence the information processing terminal 300 can display the 3D shape of the wire harness 500 and the electrical wire 501 configuring the wire harness 500. The worker carrying out the wiring work of the wire harness 500 can easily intuitively grasp the wiring path of the wire harness 500.

The binding member information comprising the information related to the dimension of the binding member 503 for bundling the electrical wires 501 configuring the wire harness 500 is created based on the binding member arranging information and the wire harness information. The amount of binding member 503 used when creating the wire harness 500 can be easily assumed at high precision even with the binding member 503 or the member that cannot be number converted such as the adhesive tape by being based on the information related to the dimension of the binding member 503. Thus, the designing of the wire harness of high precision can be easily carried out.

The length information of the main line 511, the position information of the branched point 512, and the length information of the branch line 513 can be acquired by the wire harness information based on the harness 3D information. The reduction scale at which such information can be displayed within the frame of the predefined paper size is obtained to create the harness design drawing, so that the harness design drawing can be created by the designing supporting device 100. In other words, automatic conversion from the 3D figure (harness 3D information) to the 2D figure (harness design drawing) can be carried out by the designing supporting device 100.

The technical scope of the present disclosure is not limited to the embodiment described above, and various changes can be made within a scope not deviating from the purpose of the present disclosure. For example, the target to which the wire harness 500 is wired in the embodiment described above may be a vehicle body of an automobile, a plane body of an airplane, a ship body of a ship, and the like, and is not limited to a railroad vehicle.

What is claimed is:

1. A wire harness design, manufacturing, and wiring system, comprising: a designing device for carrying out a three-dimensional design of a wire harness, the designing device performing: designing the wire harness comprising a plurality of or a single electrical wire to be wired on a body; and creating wire harness information related to the electrical wire configuring the designed wire harness; the designing device further comprising a designing supporting device, the designing supporting device assistive to the designing of the wire harness and comprising: a routing section creating wiring path information comprising a path in which electrical wire is to be arranged in a virtual space based on wiring information, the wiring information including device specifying information specifying a device to which the electrical wire is connected, a harness defining section bundling a predetermined number of electrical wires selected from a plurality of electrical wires arranged in the virtual space and defining a wire harness, and a harness information section creating the wire harness information based on the wiring path information of the electrical wire forming a defined wire harness; a manufacturing device comprising two or more board display sections arranged in sequence for carrying out manufacturing of the designed wire harness, the manufacturing device performing: displaying information comprising a harness design drawing and related to a length direction of the designed wire harness in full scale, the information being created based on the wire harness information and used for manufacturing the designed wire harness, wherein the displaying comprises displaying the harness design drawing in the two or more board display sections, the harness design drawing being divided into a plurality of drawings each for display on a separate one of the two or more board display sections; the manufacturing device further comprising a manufacturing supporting device, the manufacturing supporting device assistive to the manufacturing of the designed wire harness and a portable information processing terminal for carrying out support of wiring the designed wire harness manufactured by the manufacturing device, the portable information processing terminal performing: displaying wiring step information related to a step of wiring the wire harness on the body, the wiring step information being created based on the wire harness information and includes a three dimensional (3D) shape of the wire harness, wherein the designing device and the manufacturing device are connected, and the designing device and the information processing terminal are connected, so that information can be communicated by way of a dedicated information communication line or a known information communication network; wherein the manufacturing device displays a tolerance gauge representing a positive tolerance position and a negative tolerance position of a position for arranging the electrical wire.

2. The system according to claim 1,
wherein the wire harness information includes a length information of a main portion of the designed wire harness, a position information of a branched point of the main portion of the designed wire harness, and a length information of a branch line of the main portion of the designed wire harness.

3. The system according to claim 2,
wherein the designing device creates information related to a usage amount of a tape member used to bind the electrical wire configuring the designed wire harness based on a binding member arranging information, which is information on an arranging position of the tape member bundling and binding the plurality of the electrical wires.

4. The system according to claim 2,
wherein the designing device creates information related to a usage amount of a tape member used to bind the electrical wire configuring the designed wire harness based on a binding member arranging information, which is information on an arranging position of the tape member bundling and binding the plurality of the electrical wires.

5. The system according to claim 4,
wherein the manufacturing device displays information related to a thickness direction of the designed wire harness 1% or more larger than full scale, the information being created based on the wire harness information and used for manufacturing the wire harness.

6. The system according to claim 2,
wherein the manufacturing device displays information related to a thickness direction of the designed wire harness 1% or more larger than full scale, the information being created based on the wire harness information and used for manufacturing the wire harness.

7. The system according to claim 2,
wherein the manufacturing device displays information related to a thickness direction of the designed wire harness 1% or more larger than full scale, the information being created based on the wire harness information and used for manufacturing the wire harness.

8. The system according to claim 1,
wherein the manufacturing device displays a tolerance gauge representing a positive tolerance position and a negative tolerance position of a position for arranging the electrical wire.

9. The system according to claim 8,
wherein the designing device creates information related to a usage amount of a tape member used to bind the electrical wire configuring the designed wire harness based on a binding member arranging information, which is information on an arranging position of the tape member bundling and binding the plurality of the electrical wires.

10. The system according to claim 9,
wherein the manufacturing device displays information related to a thickness direction of the designed wire harness 1% or more larger than full scale, the information being created based on the wire harness information and used for manufacturing the designed wire harness.

11. The system according to claim 8,
wherein the manufacturing device displays information related to a thickness direction of the designed wire harness 1% or more larger than full scale, the information being created based on the wire harness information and used for manufacturing the wire harness.

12. The system according to claim 1,
wherein the designing device creates information related to a usage amount of a tape member used to bind the electrical wire configuring the designed wire harness based on a binding member arranging information, which is information on an arranging position of the tape member bundling and binding the plurality of the electrical wires.

13. The system according to claim 12,
wherein the manufacturing device displays information related to a thickness direction of the designed wire harness 1% or more larger than full scale, the information being created based on the wire harness information and used for manufacturing the wire harness.

14. The system according to claim 1,
wherein the manufacturing device displays information related to a thickness direction of the designed wire harness 1% or more larger than full scale, the information being created based on the wire harness information and used for manufacturing the designed wire harness.

15. The system according to claim 1,
wherein the wiring step information further includes a three dimensional (3D) shape of the electrical wire.

16. The system according to claim 1,
wherein designing the wire harness includes arranging the electrical wire with respect to the moving body in a virtual space to wire the electrical wire on the moving body.

17. The system according to claim 1,
wherein in the designing step, a guide section, which is a virtual member, for defining a position to arrange the electrical wire is further arranged in the virtual space, and the electrical wire is arranged through a position defined by the guide section of the virtual space to wire the electrical wire on the moving body.

18. The system according to claim 1,
wherein in the designing step, whether the electrical wire interferes with the virtual space in a predetermined region of the virtual space is determined when three-dimensionally designing the wire harness, and
when it is determined that the electrical wire interferes with the virtual space, at least one of a process of widening a shape of the virtual space comprising the predetermined region, a process of setting a virtual space different from the virtual space comprising the predetermined region as a path for at least some electrical wires, and a process of changing an arranging position of the electrical wire arranged in the predetermined region is carried out.

19. The system according to claim 1, further comprising a line organizing section carrying out an arithmetic processing of organizing the electrical wire arranged in the virtual space.

* * * * *